US005772229A

United States Patent [19]
Cattau

[11] Patent Number: 5,772,229
[45] Date of Patent: Jun. 30, 1998

[54] SLIDING HITCH

[76] Inventor: Lyle L. Cattau, 2900 "O" Plaza, Omaha, Nebr. 68107

[21] Appl. No.: 667,505

[22] Filed: Jun. 21, 1996

[51] Int. Cl.[6] .................................................. B62D 53/08
[52] U.S. Cl. ...................................... 280/438.1; 280/441
[58] Field of Search .................................... 280/407, 433, 280/438.1, 441, 901, 439, 449.2; 104/246

[56] References Cited

U.S. PATENT DOCUMENTS

| | | | |
|---|---|---|---|
| 1,951,258 | 3/1934 | Retzlaff et al. | 280/441 |
| 2,985,463 | 5/1961 | Geerds | 280/407 |
| 3,729,214 | 4/1973 | Mulcahy et al. | 280/407 |
| 3,826,516 | 7/1974 | Weber | 280/901 |
| 3,893,710 | 7/1975 | Madura | 280/407 |
| 3,963,259 | 6/1976 | Massey | 280/80 B |
| 4,429,892 | 2/1984 | Frampton et al. | 280/407 |
| 4,443,025 | 4/1984 | Martin et al. | 280/407 |
| 4,614,355 | 9/1986 | Koch | 280/438 R |
| 4,919,445 | 4/1990 | Robey | 280/149.2 |
| 5,044,651 | 9/1991 | Weikel | 280/407 |
| 5,267,514 | 12/1993 | Staehs et al. | 104/246 |
| 5,344,173 | 9/1994 | Beeler et al. | 280/438.1 |
| 5,356,167 | 10/1994 | Hall et al. | 280/433 |
| 5,449,191 | 9/1995 | Cattau | 280/438.1 |
| 5,472,222 | 12/1995 | Marcy | 280/433 |

*Primary Examiner*—Sherman Basinger
*Attorney, Agent, or Firm*—Zarley, McKee, Thomte, Voorhees & Sease; Mark D. Frederiksen

[57] ABSTRACT

The slidable hitch of the present invention includes a pedestal having a plurality of wheels mounted for rolling movement on a pair of spaced apart runners, the runners being mounted on the bed of a truck. The pedestal includes a pair of vertical side plates with projecting flanges at the lower end, the flanges journaled between an upper leg and lower back of each runner, to prevent vertical movement of the pedestal off of the runners. Each wheel is substantially enclosed within a pocket to protect the wheels from weather and the environment. A pair of set pins are mounted on each side plate and movable downwardly to engage one of a plurality of holes in the upper leg of the runner, to selectively lock the pedestal in a desired position along the runners. The pedestal includes one of a variety of hitch mechanisms, one embodiment disclosing a hitch ball mounted on a plate on the pedestal, and another embodiment disclosing a fifth wheel hitch plate mounted on the pedestal. A rocker arm assembly is mounted between the side plates of the pedestal with a beam extending transversely between a pair of pivot rods pivotally mounted on the upper end of a pair of stanchions, such that the hitch plate mounted on the beam is pivotable on a transverse axis. The stanchions are vertically adjustably mounted on the side plates to permit raising and lowering of the hitch plate on the pedestal. A housing is pivotally mounted on the beam of the rocker assembly on a pivot axis which is orthogonal to the pivotal axis of the rocker assembly, such that the hitch plate is pivotable on both transverse and longitudinal axes.

21 Claims, 7 Drawing Sheets

SLIDING HITCH

TECHNICAL FIELD

The present invention relates generally to fifth wheel and gooseneck hitches, and more particularly to a hitch specifically designed for slidable movement in the bed of a pick-up truck.

BACKGROUND OF THE INVENTION

Fifth wheel hitches were originally provided for the tractors of semi-trailer/truck combinations. However, they are becoming more common on smaller vehicles, including pick-up trucks and the like. These smaller fifth wheel hitches include a coupler face mounted on a pedestal which is conventionally affixed generally centrally within the bed of the pick-up truck. While the prior art fifth wheel hitches are convenient for towing fifth wheel type trailers with a pick-up truck, they severely limit the availability of the pick-up bed for other hauling.

Gooseneck hitches on pick-up trucks are conventionally affixed directly to the bed, and leave a large hole in the pick-up bed if removed from the pick-up. The gooseneck hitches are therefore typically mounted for generally permanent installation, due to the decrease in value of the pick-up upon removal of the hitch. As with fifth wheel hitches, the gooseneck hitch is typically centered in the middle of the pick-up bed, thereby severely reducing the cargo capacity of the pick-up, when not being utilized to tow a trailer.

SUMMARY OF THE INVENTION

It is therefore a general object of the present invention to provide an improved sliding hitch for pick-up trucks and the like.

Still a further object of the present invention is to provide a sliding hitch which is economical to manufacture, simple to install, and easy to use.

These and other objects of the present invention will be apparent to those skilled in the art.

The slidable hitch of the present invention includes a pedestal having a plurality of wheels mounted for rolling movement on a pair of spaced apart runners, the runners being mounted on the bed of a truck. The pedestal includes a pair of vertical side plates with projecting flanges at the lower end, the flanges journaled between an upper leg and lower back of each runner, to prevent vertical movement of the pedestal off of the runners. Each wheel is substantially enclosed within a pocket to protect the wheels from weather and the environment. A pair of set pins are mounted on each side plate and movable downwardly to engage one of a plurality of holes in the upper leg of the runner, to selectively lock the pedestal in a desired position along the runners. The pedestal includes one of a variety of hitch mechanisms, one embodiment disclosing a hitch ball mounted on a plate on the pedestal, and another embodiment disclosing a fifth wheel hitch plate mounted on the pedestal. A rocker arm assembly is mounted between the side plates of the pedestal with a beam extending transversely between a pair of pivot rods pivotally mounted on the upper end of a pair of stanchions, such that the hitch plate mounted on the beam is pivotable on a transverse axis. The stanchions are vertically adjustably mounted on the side plates to permit raising and lowering of the hitch plate on the pedestal. A housing is pivotally mounted on the beam of the rocker assembly on a pivot axis which is orthogonal to the pivotal axis of the rocker assembly, such that the hitch plate is pivotable on both transverse and longitudinal axes.

DESCRIPTION OF THE PREFERRED EMBODIMENT

Figure 1:
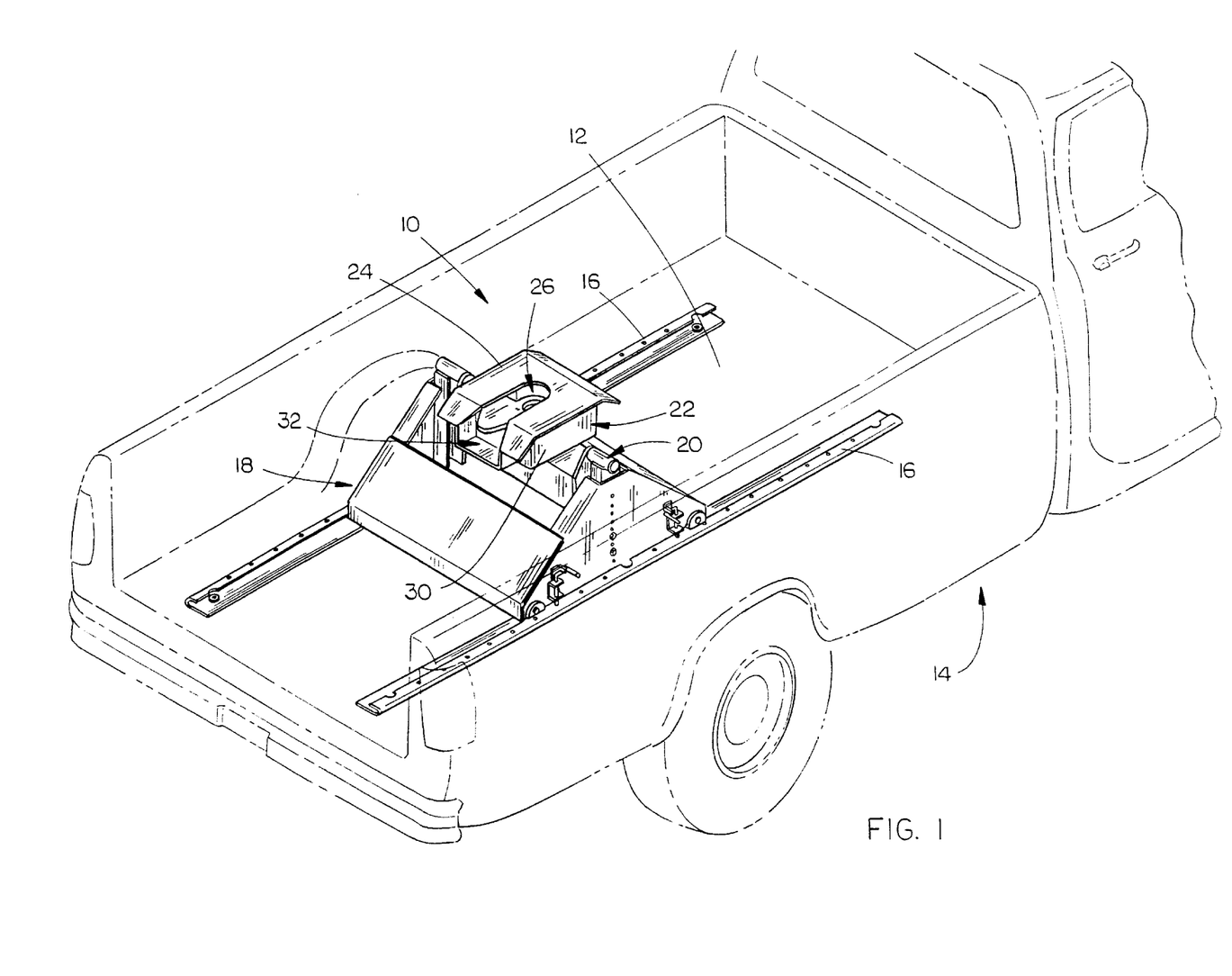
FIG. 1 is a perspective view of the fifth wheel hitch of the present invention installed in a pick-up bed.

Referring now to the drawings, in which similar or corresponding parts are identified with the same reference numeral, and more particularly to FIG. 1, the sliding hitch of the present invention is identified generally at 10 and is shown mounted on the bed 12 of a pick-up truck 14.

Fifth wheel hitch 10 includes a pair of rails or runners 16 which are mounted parallel to one another and extend forwardly and rearwardly on bed 12. A pedestal 18 is operably mounted on runners 16 for selective movement on rollers, forwardly and rearwardly along runners 16. Pedestal 18 supports a rocker arm assembly 20, which in turn supports a hook assembly 22 having a hitch plate 24 affixed to the top thereof.

Figure 4:
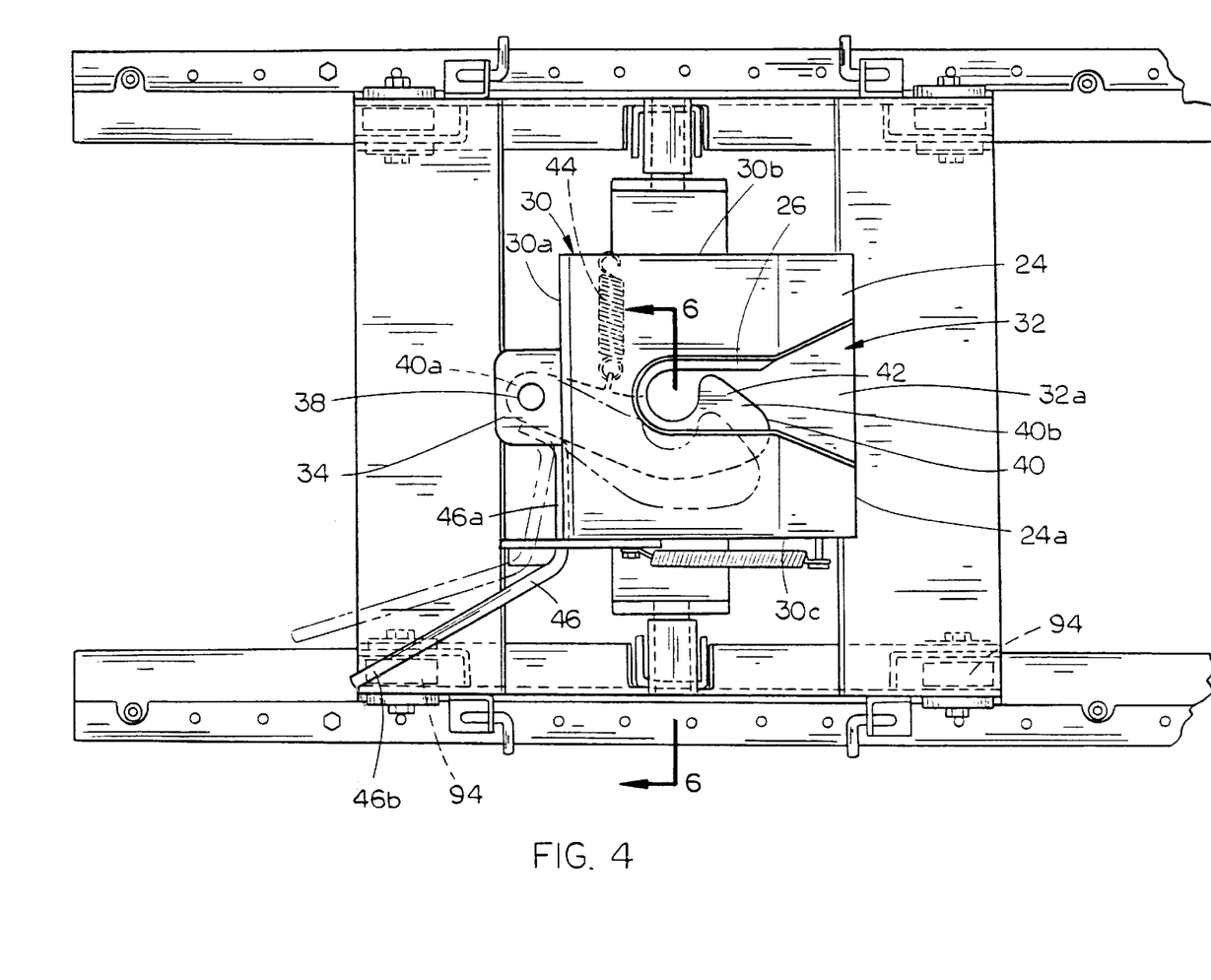
FIG. 4 is a plan view of the hitch.

Referring now to FIG. 4, hitch plate 24 has a slot 26 formed therein which extends forwardly from a rearward edge 24a of the hitch plate, and generally centrally in the hitch plate, to receive the hitch pin 28 (shown in FIG. 5) of a trailer therein. As shown in FIG. 1, hook assembly 22 includes a housing 30 which supports hitch plate 24 on rocket arm assembly 20. Slot 26 in hitch plate 24 extends downwardly into housing 30 to form a forwardly extending channel 32 having a bottom 32a, for receiving hitch pin 28 (shown in FIG. 5).

Figure 3:
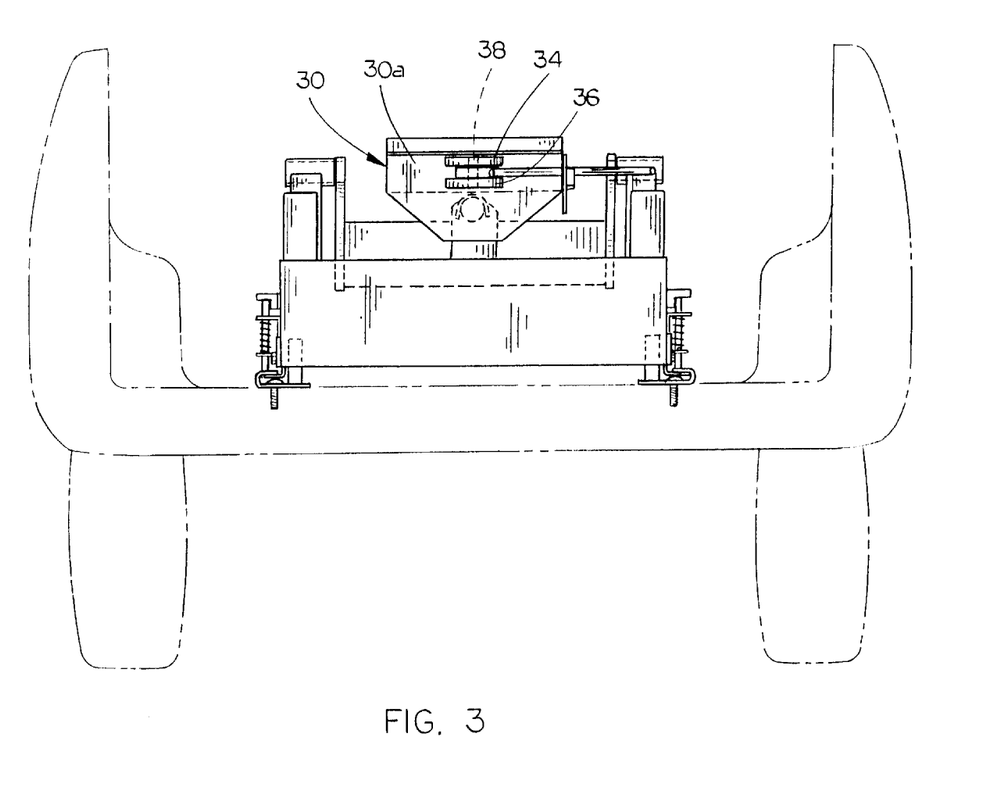
FIG. 3 is an elevational view taken from the forward side of the hitch.

Referring now to FIG. 3, a pair of upper and lower plates 34 and 36 project forwardly from a vertical forward wall 30a of housing 30. Plates 34 and 36 are parallel to one another and have a vertically oriented pin 38 extending therebetween, to form a vertical pivotal axis. As shown in FIG. 4, a hook 40 has a forward pivotal end 40a pivotally connected to pivot pin 38, such that hook 40 will pivot in a horizontal plane about the vertical axis of pivot pin 38. Hook 40 extends rearwardly from pivot pin 38 through an opening in housing forward wall 30a so as to be positioned within housing 30 spaced above channel bottom 32a and below hitch plate 24 with a hook arm 42 formed on the rearward end 40b of hook 40 for selectively retaining hitch pin 28 (shown in FIG. 5) within channel 32. A spring 44 is connected between hook 40 and a first vertical side wall 30b so as to apply a predetermined biasing force urging hook 40 into an "engaged" position with hook arm 42 maintaining a hitch pin within channel 32 (as shown in solid lines in FIG. 4).

A handle 46 is affixed to hook 40 and extends transversely outwardly from hook 40 adjacent housing forward wall 30a, in a generally horizontal plane. Handle 46 includes an inward portion 46a which extends from hook 40 adjacent forward wall 30a and projects slightly beyond housing second side wall 30c. An outward portion 46b of handle 46 is bent to project forwardly from the outward end of inward portion 46a. Handle 46 thereby permits manual movement of hook 40 from the solid line "engaged" position to the broken line "disengaged" position, shown in FIG. 4, by pivoting hook 40 on pin 38.

Figures 5, 5A:
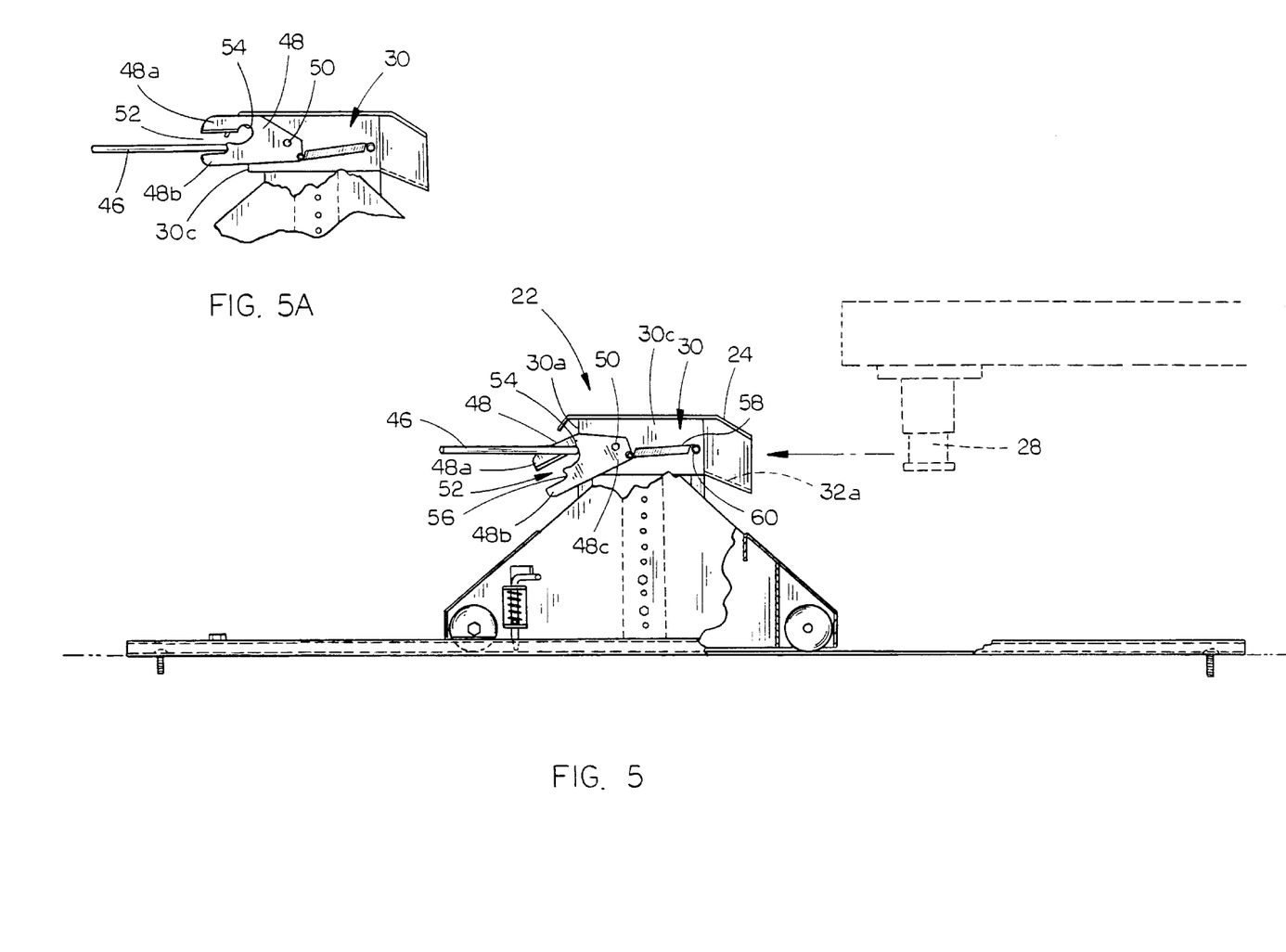
FIG. 5 is an elevational view of the hitch taken from the right side of FIG. 3.
FIG. 5A is a view similar to FIG. 5, but with the lock plate moved to the "disengaged" position.

Referring now to FIGS. 5 and 5A, a handle lock plate 48 is pivotally mounted on a bolt 50 to housing side wall 30c, with a pair of forwardly projecting upper and lower legs 48a and 48b projecting forwardly beyond the forward side 30a of housing 30. A throat 52 is formed between projecting legs 48a and 48b, through which the inward portion of handle 46 is journaled and retained in the engaged and disengaged positions. A hook-shaped catch 54 is formed in throat 52 on upper leg 48a, which will hold handle 46 in the engaged position, and prevent forward movement of handle 46 to the "disengaged" position. A second hook-shaped catch 56 is formed in throat 52 on lower leg 48b, which will retain handle 46 in the "disengaged" position and prevent rearward movement of handle 46 towards the "engaged" position. A spring 58 is connected to a rearward end 48c of lock plate 48 and a fixed bolt 60, to bias lock plate 48 and apply a force which urges the lock plate downwardly towards the "engaged" position. In this way, spring 58 provides additional force to retain handle 46 in the engaged position within catch 54 of lock plate 48. FIG. 5 shows lock plate 48 in the "engaged" position, while FIG. 5A shows lock plate 48 and handle 46 in the "disengaged" position.

Figure 2:
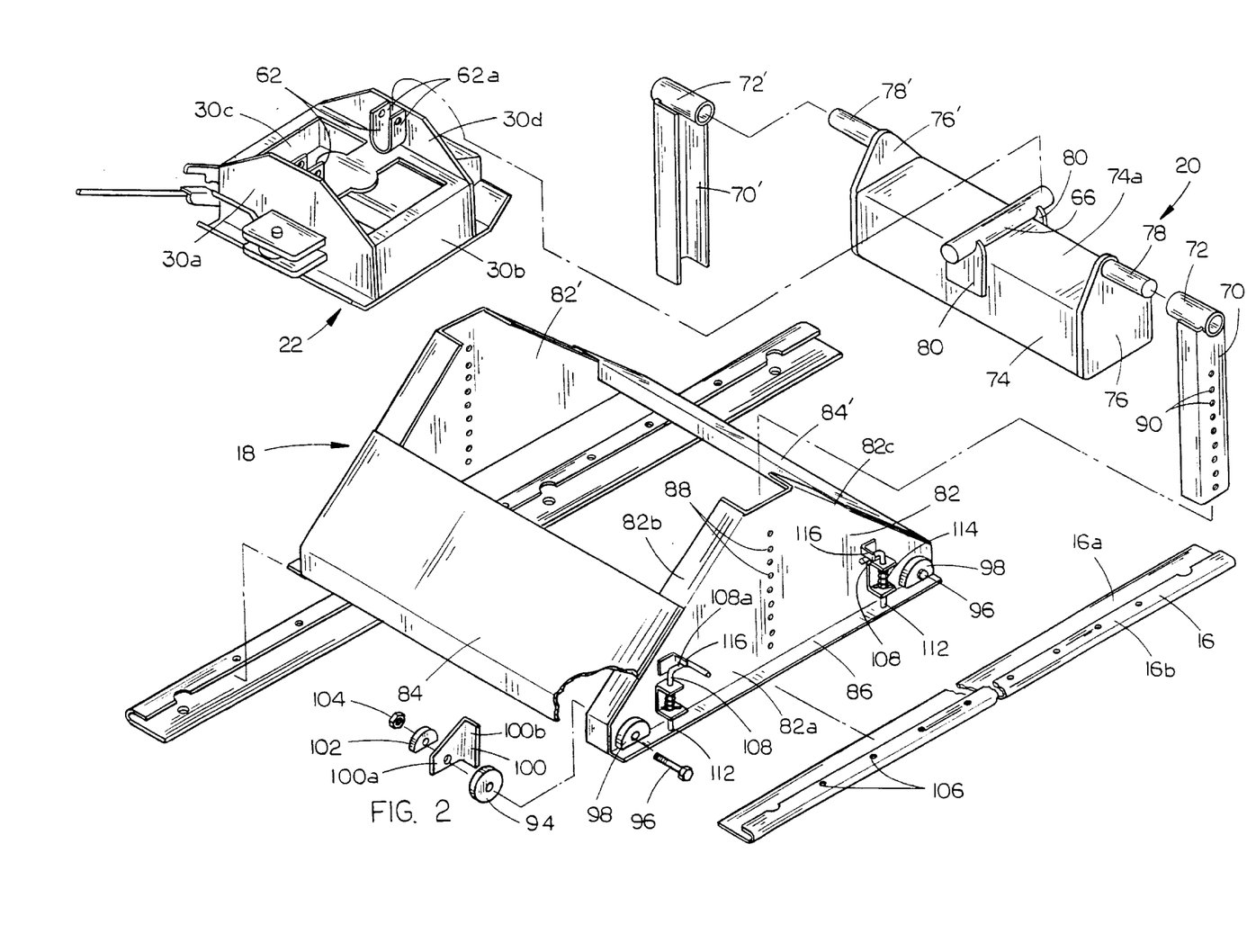
FIG. 2 is an exploded perspective view of the fifth wheel hitch.
Figure 6:
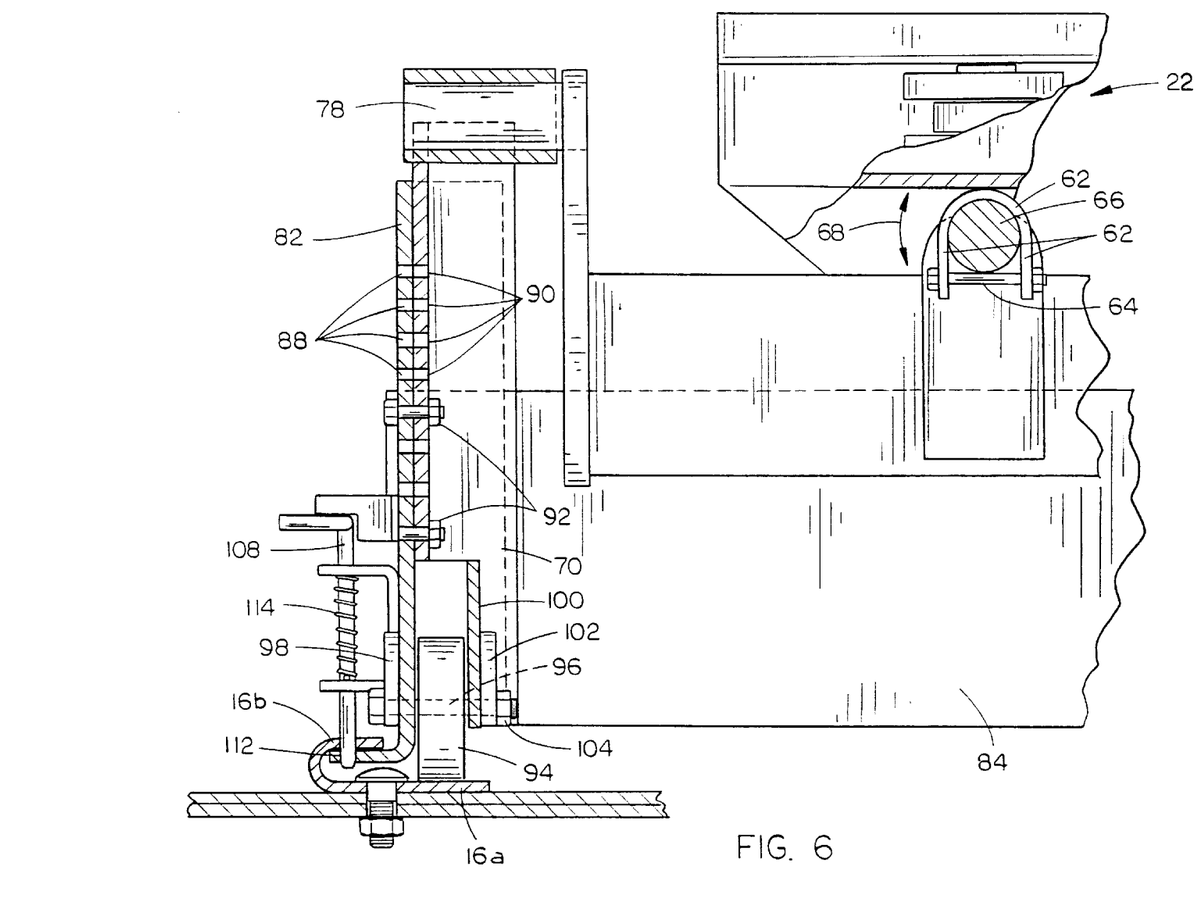
FIG. 6 is a sectional view taken at lines 6—6 in FIG. 4.

Referring now to FIG. 2, the bottom of hook assembly 22 is shown in more detail. Forward and rearward walls 30a and 30d project downwardly beyond side walls 30b and 30c, each end wall 30a and 30d having a generally U-shaped bracket 62 affixed thereto. The legs 62a of each bracket 62 have apertures therethrough which are coaxial to receive a retainer bolt 64 therethrough, as shown in FIG. 6. Brackets 62 are affixed to inward surfaces of forward and rearward end walls 30a and 30d with their legs directed downwardly, and are aligned so as to receive a cylindrical pivot bar 66 from the rocker arm assembly 20, therein. Thus, hook assembly 22 is pivotable about the longitudinal axis of pivot bar 66, as shown by arrow 68 in FIG. 6. Retainer bolt 64 prevents hook assembly 22 from being removed from pivot bar 66 while permitting pivotal movement thereon.

Referring once again to FIG. 2, rocket arm assembly 20 will support hook assembly 22 and permit pivotal movement about a transverse horizontal axis. Rocker arm assembly 20 includes a pair of spaced apart vertically oriented stanchions 70 and 70', each having a sleeve 72 and 72' affixed to the upper ends thereof. Stanchions 70 and 70' are connected to pedestal 18 (as described in more detail hereinbelow) with sleeves 72 and 72' oriented coaxially. An elongated beam 74 has upwardly projecting end plates 76 and 76' mounted on the longitudinal ends thereof. End plates 76 and 76' extend upwardly beyond an upper surface 74a of beam 74. Pivot rods 78 and 78' are mounted on end plates 76 and 76' respectively, and project outwardly therefrom coaxially. As shown in FIG. 2, pivot rods 78 and 78' are mounted on end plates 76 and 76' near the upper ends thereof such that beam 74 will swing below the axis of pivot rods 78 and 78'. Pivot rods 78 and 78' are journaled into sleeves 72 and 72' to permit this swinging or rocking motion between stanchions 70 and 70'.

Pivot bar 66 is mounted orthogonal and spaced below the pivotal axes of pivot rods 78 and 78', and spaced above the upper surface 74a of beam 74. A pair of support plates 80 are mounted on forward and rearward side walls of beam 74, with an arcuate notch in the upper ends thereof to receive and support pivot bar 66.

Pedestal 18 includes a pair of generally triangular side plates 82 and 82' which are affixed in vertical generally parallel positions by forward and rearward cross-members 84 and 84'. Because side plates 82 and 82' are identical in construction, only side plate 82 will be described herein in detail.

Side plate 82 has an outwardly projecting flange 86 projecting continuously along the base edge 82a thereof. Flange 86 is slidably received within runner 16, as described in more detail hereinbelow. A plurality of apertures 88 are formed in a vertical line centered between the upper edges 82b and 82c of side plate 82. Apertures 88 correspond with apertures 90 formed in a vertical line along the height of stanchion 70, such that bolts 92 (as shown in FIG. 6) may be selectively journaled through pairs of apertures 88 and 90 to secure stanchion 70 in one of a variety of vertical positions on side plate 82. In this way, the height of the transverse pivotal axis of pivot rods 78 and 78' may be adjusted vertically as desired.

Referring now to FIGS. 2, 4 and 6, a pair of wheels 94 are rotatably mounted to the inward face of side plate 82 at the forward end rearward apizes thereof. A bolt 96 serves as an axle for each wheel 94 and is threaded through a semicircular outer hub 98, thence through side plate 82, through wheel 94, through a leg 100a of a spacer bracket 100, and thence through an inward hub 102. A nut 104 retains the bolt in position. Spacer bracket 100 has a transverse leg 100b and a longitudinal leg 100a which form an enclosure when mounted on side plate 82 and cross members 84, so as to surround the majority of the upper portion of wheel 94 and protect it from the elements.

Each runner 16 has a generally J-shaped cross-section, with a flat back 16a and a short leg 16b projecting over the top of and parallel to back 16a. A series of holes 106 are formed in leg 16b and are aligned along the length of runner 16, to receive the lower end of set pins 108 operably connected to side plate 82. As shown in FIGS. 2 and 6, a pair of set pins 108 are vertically slidably journaled through support brackets 110 mounted on side plate 82. Flange 86 of side plate 82 has a pair of openings 112 aligned with the lower end of set pins 108 to selectively receive the lower end of the set pins. A spring 114 has one end attached to each set pin 108 and oriented so as to be compressed when set pin 108 is moved upwardly out of engagement with openings 112 in flange 86 (as shown in FIGS. 2 and 6).

The upper ends of set pins 108 are bent orthogonal to the vertical portion, to present an arm 108a which may be selectively retained over a projecting tab 116 mounted on side plate 82. In this way, tab 116 will retain set pin 108 in an upwardly disposed position out of engagement with apertures 106 of runner 16, while springs 114 will urge pins 108 into engagement with apertures 106 and openings 112 of flange 86, thereby securing pedestal 18 in a selected position on runners 16. As shown in FIG. 6, the back 16a of runner 16 extends a distance to provide a support path for wheels 94 thereon.

Figure 7:
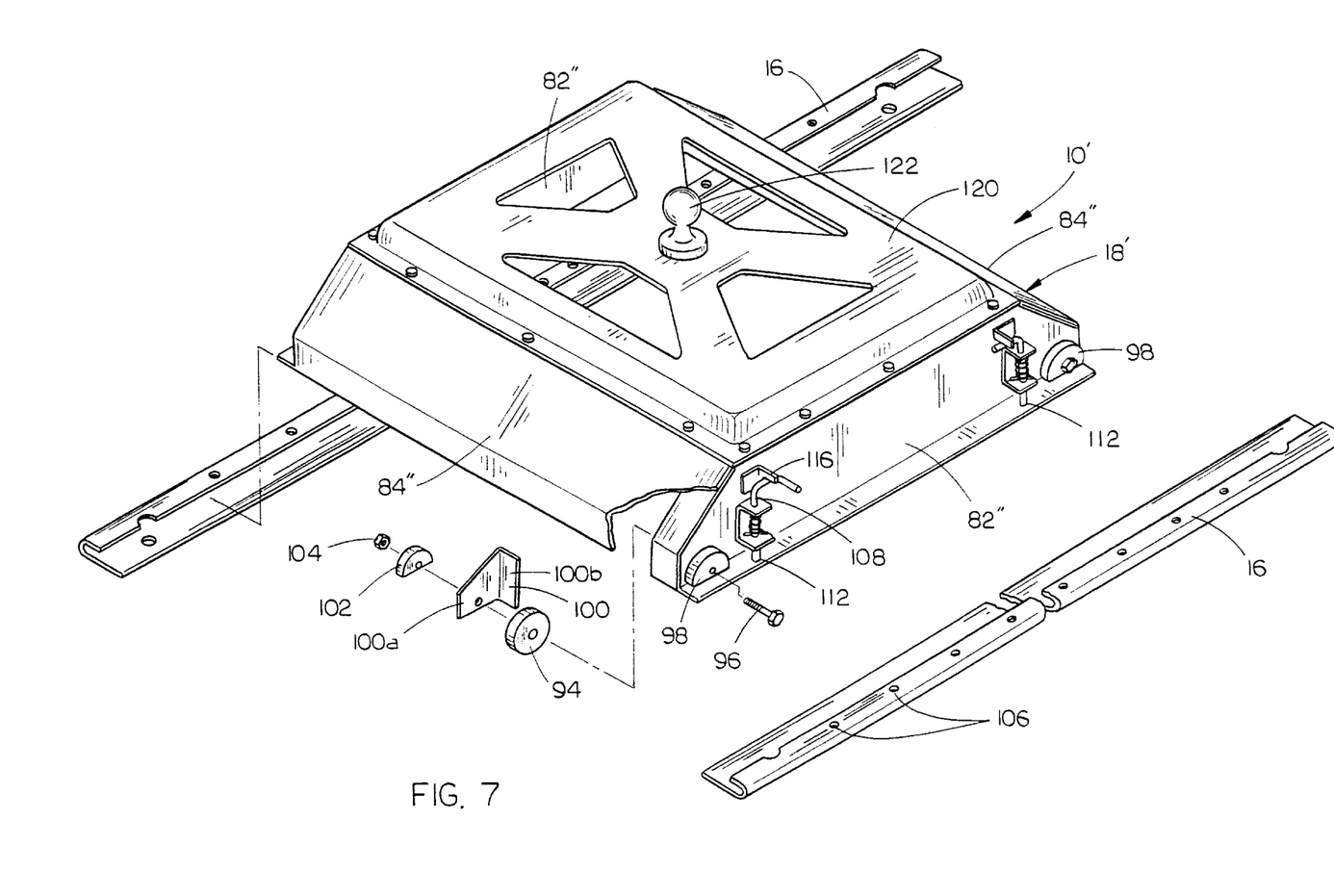
FIG. 7 is an exploded perspective view of a gooseneck hitch of the present invention.

Referring now to FIG. 7, a second embodiment of the sliding hitch of the present invention is designed generally at 10', and is operably connected to the same runners 16 which are utilized with sliding hitch 10 of the first embodiment of the invention. The second embodiment of hitch 10' includes a pedestal 18' which utilizes many of the same components as the pedestal 18 of the first embodiment of the invention, as described in more detail hereinbelow. Pedestal 18' supports a generally horizontally oriented plate 120 having a hitch ball 122 mounted generally centrally on the upper surface thereof. Hitch ball 122 is of a conventional type for receiving a gooseneck style hitch on a trailer.

Pedestal 18' includes side blades 82" which are truncated versions of side plates 82 of the first embodiment of the invention. Cross members 84" extend between side plates 82" to maintain the side plates in vertical generally parallel positions.

Pedestal 18' includes the same wheels 94, bolt 96, outer hub 98, spacer bracket 100, inward hub 102 and nut 104 thereon as pedestal 18 of the first embodiment of the invention, to permit rolling of pedestal 18' on runners 16. Similarly, pedestal 18' also includes the same set pins 108, brackets 110, flange openings 112, springs 114 and tabs 116 as pedestal 18 for selectively locking the pedestal in position on runners 16.

Whereas the invention has been shown and described in connection with the preferred embodiment thereof, many modifications, substitutions and additions may be made which are within the intended broad scope of the appended claims.

I claim:

1. A slidable hitch, comprising:

a pair of spaced apart runners oriented in spaced apart parallel relationship and extending forwardly and rearwardly:

each of said runners including a back portion extending the length of the runner, and a leg portion projecting over the top of and parallel to the back portion and extending the length of the runner:

each said runner back portion having a transverse width greater than the overlying leg portion, to form a rail surface extending the length of the runner oriented inwardly of the leg portion, a pedestal having a plurality of wheels, operably mounted on the runners with the wheels in operable contact with the runner rail surfaces for rolling movement in forward and rearward directions alone the runners:

said wheels having a diameter greater than the height of the runner back portions, such that the wheels roll on the rail surfaces laterally and adjacent the runner leg portions:

said pedestal including means for preventing vertical movement of the pedestal off of the runners while permitting forward and rearward movement of the pedestal on the runners:

said means for preventing vertical movement of the pedestal including:

said pedestal having opposing generally vertical side plates extending forwardly and rearwardly; and each side plate having a flange formed along a lower edge which projects outwardly orthogonally between an associated runner back portion and leg portion:

lock means for selectively preventing forward and rearward movement of the pedestal in a selected position on the runners: and hitch means on the pedestal for selectively connecting a trailer to the pedestal.

2. A slidable hitch, comprising:

a pair of spaced apart runners oriented in spaced apart parallel relationship and extending forwardly and rearwardly:

a pedestal having a plurality of wheels, operably mounted on the runners with the wheels in operable contact with the runners for rolling movement in forward and rearward directions alone the runners:

each said wheel being substantially enclosed within an individual pocket formed on the pedestal, each pocket enclosing at least an entire upper half of a wheel, with a lower portion of each wheel projecting downwardly out of each pocket and into contact with said rail surface;

said pedestal including means for preventing vertical movement of the pedestal off of the runners while permitting forward and rearward movement of the pedestal on the runners:

lock means for selectively preventing forward and rearward movement of the pedestal in a selected position on the runners: and hitch means on the pedestal for selectively connecting a trailer to the pedestal.

3. A slidable hitch, comprising:

a pair of spaced apart runners oriented in spaced apart parallel relationship and extending forwardly and rearwardly:

each of said runners including a back portion extending the length of the runner, and a leg portion protecting over the top of and parallel to the back portion and extending the length of the runner;

each said runner back portion having a transverse width greater than the overlying leg portion, to form a rail surface extending the length of the runner oriented inwardly of the leg portion;

a pedestal having a plurality of wheels, operably mounted on the runners with the wheels having downwardly projecting rolling contact surfaces in rolling engagement with the runners for rolling movement in forward and rearward directions alone the runners:

each said wheel being substantially enclosed within an individual pocket formed on the pedestal, with a lower portion of each wheel projecting downwardly out of each pocket and into contact with said rail surface:

said pedestal including means for preventing vertical movement of the pedestal off of the runners while permitting forward and rearward movement of the pedestal on the runners:

said means for preventing vertical movement of the pedestal including:

said pedestal having opposing generally vertical side plates extending forwardly and rearwardly: and each side plate having a flange formed along a lower edge which projects outwardly orthogonally between an associated runner back portion and leg portion:

lock means for selectively preventing forward and rearward movement of the pedestal in a selected position on the runners:

said lock means including:

each said runner leg portion having a plurality of holes therethrough spaced apart along the length of the runner; and each said side plate having at least one set pin operably connected thereto for movement between an engaged position with a lower end journaled through one of said plurality of runner holes, and a disengaged position with a lower end retracted from the runner holes; and hitch means on the pedestal for selectively connecting a trailer to the pedestal.

4. The hitch of claim 3, wherein said lock means further includes each said side plate flange having an opening therethrough aligned with the lower end of a set pin, and wherein each said set pin extends into journaled engagement through the flange opening when moved to the engaged position.

5. The hitch of claim 4, wherein said lock means further comprises biasing means on said set pins for biasing the set pins downwardly to the engaged position.

6. The hitch of claim 5, wherein said hitch means includes a generally horizontally oriented plate extending between upper edges of the side plates, and a hitch ball projecting upwardly from the horizontal plate.

7. The hitch of claims 5, wherein said hitch means includes a hitch plate with a forwardly extending slot formed in a rearward edge thereof for receiving a depending pin from a trailer.

8. The hitch of claim 5, wherein said pedestal further includes a rocker arm assembly adjustably connected thereto, with said hitch means connected to the rocker arm assembly, said rocker arm assembly including:
  a pair of spaced apart vertical stanchions connected to said side plates;
  means for adjustably connecting the stanchions to the side plates for selective vertical adjustable movement thereon; and
  an elongated beam supported below and between a pair of coaxial pivot rods for pivotal movement about the axes of the pivot rods, said pivot rods pivotally mounted to upper ends of the stanchions to form a vertically adjustable transverse pivot axis for the hitch means.

9. The hitch of claim 8, further comprising a housing pivotally mounted on said beam, for pivotal movement about a longitudinal axis orthogonal to the transverse pivot axis of the rocker assembly, said hitch means mounted on said housing for pivotal movement on both longitudinal and transverse axes.

10. The hitch of claim 9, wherein said hitch means includes a hitch plate mounted on an upper end of the housing, with a forwardly extending slot formed in a rearward edge thereof for receiving a depending pin from a trailer.

11. The hitch of claim 10, wherein said housing includes a forwardly extending channel therein aligned with the slot in the hitch plate, to receive a depending pin projecting through the hitch plate slot, and further comprising hook means operably mounted on said housing for selectively engaging a pin within the channel and preventing rearward movement of the pin from the channel, said hook means being operable between engaged and disengaged positions.

12. A slidable hitch, comprising:
  a pair of spaced apart runners oriented in spaced apart parallel relationship and extending forwardly and rearwardly:
  each of said runners including a back portion extending the length of the runner, and a leg portion projecting over the top of and parallel to the back portion and extending the length of the runner:
  a pedestal having a plurality of wheels, operably mounted on the runners with the wheels in operable contact with the runners for rolling movement in forward and rearward directions along the runners;
  said pedestal including means for preventing vertical movement of the pedestal off of the runners while permitting forward and rearward movement of the pedestal on the runners:
  said means for preventing vertical movement of the pedestal including:
    said pedestal having opposing generally vertical side plates extending forwardly and rearwardly: and
    each side plate having a flange formed along a lower edge which projects outwardly orthogonally between an associated runner back portion and leg portion:
  lock means for selectively preventing forward and rearward movement of the pedestal in a selected position on the runners:
  said lock means including:
    each said runner leg portion having a plurality of holes therethrough spaced apart along the length of the runner; and
    each said side plate having at least one set pin operably connected thereto for movement between an engaged position with a lower end journaled through one of said plurality of runner holes, and a disengaged position with a lower end retracted from the runner holes; and
  hitch means on the pedestal for selectively connecting a trailer to the pedestal.

13. The hitch of claim 12, wherein said pedestal further includes a rocker arm assembly adjustably connected thereto, with said hitch means connected to the rockier arm assembly, said rocket arm assembly including:
  a pair of spaced apart vertical stanchions connected to said side plates;
  means for adjustably connecting the stanchions to the side plates for selective vertical adjustable movement thereon; and
  an elongated beam supported below and between a pair of coaxial pivot rods for pivotal movement about the axes of the pivot rods, said pivot rods pivotally mounted to upper ends of the stanchions to form a vertically adjustable transverse pivot axis for the hitch means.

14. The hitch of claim 13, further comprising a housing pivotally mounted on said beam, for pivotal movement about a longitudinal axis orthogonal to the transverse pivot axis of the rocker assembly, said hitch means mounted on said housing for pivotal movement on both longitudinal and transverse axes.

15. The hitch of claim 14, wherein said hitch means includes a hitch plate mounted on an upper end of the housing, with a forwardly extending slot formed in a rearward edge thereof for receiving a depending pin from a trailer.

16. The hitch of claim 15, wherein said housing includes a forwardly extending channel therein aligned with the slot in the hitch plate, to receive a depending pin projecting through the hitch plate slot, and further comprising hook means operably mounted on said housing for selectively engaging a pin within the channel and preventing rearward movement of the pin from the channel, said hook means being operable between engaged and disengaged positions.

17. The hitch of claim 12, wherein said hitch means includes a generally horizontally oriented plate extending between upper edges of the side plates, and a hitch ball projecting upwardly from the horizontal plate.

18. A slidable hitch, comprising:
  a pair of spaced apart runners oriented in spaced apart parallel relationship and extending forwardly and rearwardly:
  each of said runners including a back portion extending the length of the runner, and a leg portion projecting over the top of and parallel to the back portion and extending the length of the runner:

a pedestal having a plurality of wheels, operably mounted on the runners with the wheels in operable contact with the runners for rolling movement in forward and rearward directions along the runners:

said pedestal including means for preventing vertical movement of the pedestal off of the runners while permitting forward and rearward movement of the pedestal on the runners;

said means for preventing vertical movement of the pedestal including:
  said pedestal having opposing generally vertical side plates extending forwardly and rearwardly: and
  each side plate having a flange formed along a lower edge which projects outwardly orthogonally between an associated runner back portion and leg portion;

lock means for selectively preventing forward and rearward movement of the pedestal in a selected position on the runners:

hitch means on the pedestal for selectively connecting a trailer to the pedestal: and po1 said pedestal further including a rocker arm assembly adjustably connected thereto, with said hitch means connected to the rocker arm assembly, said rocker arm assembly including:
  a pair of spaced apart vertical stanchions connected to said side plates;
  means for adjustably connecting the stanchions to the side plates for selective vertical adjustable movement thereon; and
  an elongated beam supported below and between a pair of coaxial pivot rods for pivotal movement about the axes of the pivot rods, said pivot rods pivotally mounted to upper ends of the stanchions to form a vertically adjustable transverse pivot axis for the hitch means.

19. The hitch of claim 18, further comprising a housing pivotally mounted on said beam, for pivotal movement about a longitudinal axis orthogonal to the transverse pivot axis of the rocker assembly, said hitch means mounted on said housing for pivotal movement on both longitudinal and transverse axes.

20. The hitch of claim 19, wherein said hitch means includes a hitch plate mounted on an upper end of the housing, with a forwardly extending slot formed in a rearward edge thereof for receiving a depending pin from a trailer.

21. The hitch of claim 20, wherein said housing includes a forwardly extending channel therein aligned with the slot in the hitch plate, to receive a depending pin projecting through the hitch plate slot, and further comprising hook means operably mounted on said housing for selectively engaging a pin within the channel and preventing rearward movement of the pin from the channel, said hook means being operable between engaged and disengaged positions.

* * * * *